United States Patent [19]
Gentry

[11] Patent Number: 4,718,191
[45] Date of Patent: Jan. 12, 1988

[54] ARTIFICIAL FISHING LURE

[76] Inventor: Donald D. Gentry, P.O. Box 64, Carterville, Ill. 62918

[21] Appl. No.: 818,706

[22] Filed: Jan. 14, 1986

[51] Int. Cl.$^4$ ............................................. A01K 85/00
[52] U.S. Cl. .............................. 43/42.13; 43/42.11; 43/42.49
[58] Field of Search ................. 43/42.13, 42.04, 42.11, 43/42.14, 42.15, 42.16, 42.17, 42.19, 42.26, 42.27, 42.28, 42.49

[56] References Cited

U.S. PATENT DOCUMENTS

| | | | |
|---|---|---|---|
| 3,110,979 | 11/1963 | Woodley | 43/42.13 |
| 3,253,363 | 5/1966 | Steehn | 43/42.49 |
| 3,808,726 | 5/1974 | Flanagan | 43/42.13 |
| 4,003,154 | 1/1977 | Carver | 43/42.13 |
| 4,011,681 | 3/1977 | Johnson | 43/42.11 |
| 4,033,065 | 7/1977 | Shannon | 43/42.13 |
| 4,209,932 | 7/1980 | Pate | 43/42.13 |

FOREIGN PATENT DOCUMENTS 1199944 12/1959 France ........................ 43/42.16

*Primary Examiner*—Kurt Rowan
*Attorney, Agent, or Firm*—L. S. Van Landingham, Jr.

[57] ABSTRACT

An artificial fishing lure is disclosed including first and second rearwardly diverging frame members that are connected by an eye means for attaching a fishing line. A weight and fish hook are carried by the first frame member, and a unique movable or pivotable arm member is connected to the trailing end portion of the second frame member. One or more buzz blades or spinner blades are mounted on the arm member or attached to the trailing end thereof. The arm member is free to move or pivot back and forth and up and down at the point of attachment at its leading end portion, but the trailing end portion and the buzz blades and/or spinner blades carried thereby are prevented from moving toward the first frame member a distance sufficient to foul any part of the lure. The lure is very versatile and is further characterized by markedly increased sound and action. The arm member and blades assume a vertical position in a free fall and the blades imitate an injured bait fish. The arm member and blades assume a generally horizontal position when the lure is pulled against the water and the blades move vigorously from side to side and up and down, and imitate an active bait fish. The lure may be made weedless by placing a spinner blade over the hook, and the spinner blade and arm member are knocked harmlessly aside by a striking fish thereby eliminating missed fish.

16 Claims, 7 Drawing Figures

4,718,191

ARTIFICIAL FISHING LURE

THE BACKGROUND OF THE INVENTION

1. Field of the Invention

This invention broadly relates to artificial fishing lures. In some of its more specific aspects, the invention is concerned with artificial fishing lures which are nonfouling and which employ one or more buzz blades, spinner blades, devices which create sound waves within the water, or other means serving to attract nearby fish. The invention additionally relates to artificial fishing lures of the foregoing class which are further characterized by a unique structure which markedly enhances the activity and versatility of the buzz blades, spinner blades and/or noise creating devices attached thereto, and thereby greatly increases the overall effectiveness of the lure.

2. Description of the Prior Art

It has long been recognized in the prior art to provide a fishing lure with one or more buzz blades or spinner blades which rotate during movement of the lure through water. For example, U.S. Pat. Nos. 3,012,356, 3,143,824, 3,546,804, 3,750,325, 3,828,463, 4,045,903 and 4,453,334, among others, relate to fishing lures having an outwardly extending stationary arm with a blade-type spinner attached to the end of the arm. U.S. Pat. Nos. 4,074,454 and 4,329,804, among others, provide lures having an outwardly extending stationary arm with a first blade-type spinner mounted along the central portion of the arm and a second blade-type spinner terminating from the end of the arm. U.S. Pat. No. 4,033,065 discloses two spinner blades attached to the end of a stationary arm. Another well-known type of lure is disclosed in U.S. Pat. Nos. 3,093,923 and 3,500,573, among others, and includes a stationary arm extending from the lure with a rotatable buzz-bait spinner mounted thereon.

The aforementioned prior art lures involve the use of a stationary or fixed wire frame for carrying the buzz blades and/or spinner blades which results in a number of important limitations and/or disadvantages. For example, when a spinner blade is placed over the hook to make a prior art lure weedless, the stationary or fixed frame acts as a guard and cannot be harmlessly knocked aside by the impact of a striking fish in an attempt to get at the baited hook. Rather, the impact of the strike knocks the entire lure aside, including the hook, and the striking fish is missed.

The stationary or fixed prior art frames also restrict both sound and action in lures which combine a buzz blade with a spinner blade. This is especially pronounced in lures having the spinner blade mounted so as to be positioned behind the buzz blade when the lure is pulled through the water. The fixed frame does not permit the buzz blade and/or spinner blade to move and rotate freely and vigorously from side to side and/or up and down as the lure is pulled against the water. As a result, both the sound and action of the buzz blade and spinner blade are sharply restricted and the lure is much less attractive to fish.

The stationary or fixed prior art frames further restrict the versatility of lures which have both a buzz blade and a spinner blade mounted thereon. In instances where the spinner blade is mounted behind the buzz blade, the spinner blade is not free to vigorously jump up and down like a natural bait fish in the wake of the buzz blade as the lure is pulled rapidly against the water. The fixed prior art frames also do not permit the buzz blade and spinner blade mounted thereon to move from horizontal positions into vertical positions when the lure is no longer pulled against the water and is suddenly allowed to free fall, or when the lure is cast and allowed to free fall. In such instances, the buzz and spinner blades cannot imitate an injured bait fish during the free fall and are much less attractive to fish.

The aforementioned and other deficiencies and disadvantages of the prior art lures having stationary or fixed frames have been long recognized by those skilled in this art. However, an entirely satisfactory alternative thereto was not available prior to the present invention.

THE SUMMARY OF THE INVENTION

The present invention overcomes the aforementioned and other disadvantages and deficiencies of the prior art. This is accomplished by providing an artificial fishing lure characterized by the novel and improved construction and design described and claimed hereinafter.

In one presently preferred embodiment, the artificial fishing lure of the invention comprises an elongated frame having a leading end and a trailing end. The frame includes first and second generally longitudinally extending and rearwardly diverging elongated frame members having leading and trailing end portions, and also an eye connecting the leading end portions of the first and second frame members. The eye is located adjacent the leading end of the frame and is adapted to receive a fishing line whereby the fishing line may be attached to the fishing lure while fishing. The trailing end portions of the elongated first and second frame members are arranged in spaced relationship with respect to each other. A weight is carried by the first frame member, and a fish hook is carried by the trailing end portion of the first frame member and extends rearward therefrom. A movable or pivotable elongated arm member having leading and trailing end portions is carried by the trailing end portion of the second frame member. One or more fish attracting means is carried by the arm member. A suitable connecting means is provided for movably or pivotably connecting the leading end portion of the arm member to the trailing end portion of the second elongated frame member. The connecting means is effective to allow the arm member to move or pivot back and forth around the point of attachment at its leading end portion and to allow the trailing end portion to move toward and away from the frame. Means is provided, which includes the connecting means, for preventing the arm member and the fish attracting means carried thereby from moving toward the frame a distance sufficient to foul the frame, the weight, the fish hook, or a fishing line attached to the eye means.

It will be appreciated by those skilled in this art that the above mentioned embodiment may be modified to include equivalent structure, or to include additional structure, without departing from the invention. The invention, including the above embodiment and certain modifications thereof, will be described more fully hereinafter along with various novel features and advantages thereof.

BRIEF DESCRIPTION OF THE ACCOMPANYING DRAWINGS

The invention will be described hereinafter in greater particularity with reference to the presently preferred embodiments thereof illustrated in the accompanying drawings, wherein.

Figure 1:
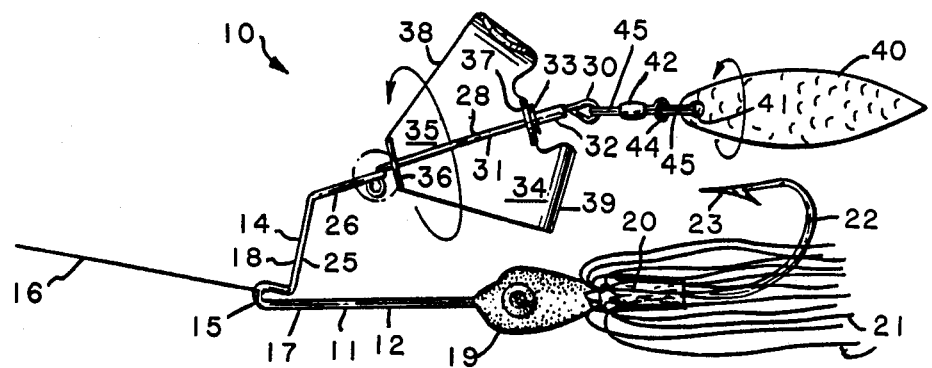
FIG. 1 is a side view of the artificial fishing lure of the invention wherein the lure is being pulled through the water.

THE DETAILED DESCRIPTION OF THE INVENTION INCLUDING THE PRESENTLY PREFERRED EMBODIMENTS

In one presently preferred embodiment, the artificial fishing lure 10 of the invention has a fixed or rigid wire frame 11 which includes first and second generally longitudinally extending and rearwardly diverging elongated frame members 12 and 14. The frame 11 also includes an open eye 15 for receiving a fishing line 16 which connects the adjacent leading end portions 17 and 18 of the first and second frame members 12 and 14.

As is best seen in FIG. 1, the frame member 12 extends rearward from eye 15 and has a weight 19 formed on the trailing end portion thereof. The weight 19 is made of lead or other dense material and is preferably shaped and painted to physically and visually resemble a bait fish. A resilient collar 20, which is preferably made or rubber or suitable plastic material, is secured to the trailing end portion of weight 19. A plurality of strands 21 extend from the leading end of collar 20 and serve to camouflage the fish hook 22 and the barbed point 23 thereof. The hook 22 is securely attached to the trailing end of frame member 12 and weight 19, and extends rearward therefrom as is illustrated in FIG. 1.

One end of fishing line 16 is passed through the open eye 14 and is tied around the leading edge thereof in the conventional manner. The other end of fishing line 24 is attached to a fishing reel (not shown). It is understood that the lure 10, fishing line 24 and the fishing reel, in general, are used in the usual manner when fishing except when specifically noted to the contrary hereinafter.

Figure 2:
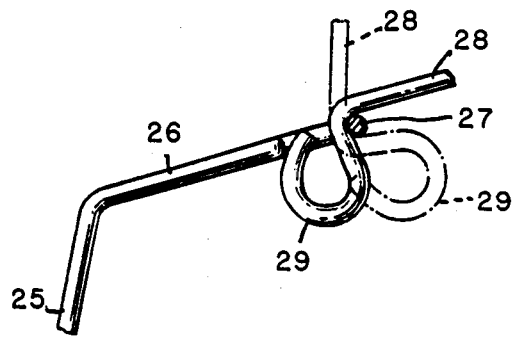
FIG. 2 is an enlarged fragmentary side elevational view of the leading looped end of the movable arm and the trailing looped end of the outwardly extending portion of the frame of the lure of FIG. 1, with the movable arm being shown in a first position in solid line and in an alternative position in phantom line.
Figure 3:
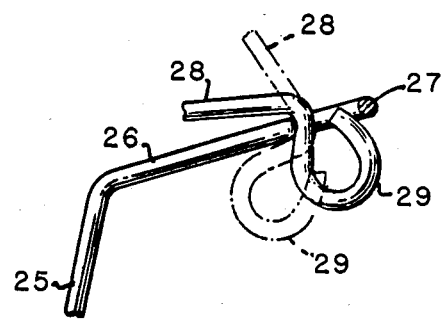
FIG. 3 is an enlarged fragmentary side elevational view somewhat similar to FIG. 2, but with the movable arm being shown in an additional first position in solid line and in an additional alternative position in phantom line.
Figure 4:
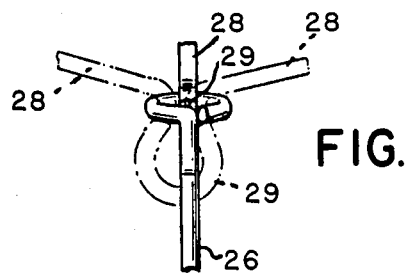
FIG. 4 is an enlarged fragmentary top view of the leading looped end of the movable arm and the trailing looped end of the outwardly extending portion of the frame of the lure of FIG. 1, with the movable arm being shown in a first position in solid line, and in two alternative positions in phantom line.

The frame member 14 diverges sharply outward from eye 15 and away from frame member 12, and includes a first portion 25 and an angularly disposed second portion 26. The second portion 26 terminates in a loop 27 which extends transversely with respect to the longitudinal axis of portion 26. Movable or pivotable arm 28 extends through loop 27 and includes a first loop 29 having an external diameter greater than the internal diameter of loop 27 to thereby prevent loop 29 from passing through loop 27. Preferably, there exists approximately a ninety degree downward bend between arm 28 and loop 29, as can be seen in FIGS. 2 and 3, and loop 29 occupies a plane substantially perpendicular to loop portion 27. Through the interaction of loop 29 and loop 27, complete 360 degree rotation of arm 28 within the latitudinal plane is possible, as seen in FIG. 4, while only about 180 degree rotation of arm 28 within the longitudinal plane is possible, i.e., from about the position shown in solid line in FIG. 2 to about the position shown in solid line in FIG. 3, due to the abutting action of loop 29 and loop 27. Movable arm 28 also includes a straight central shaft portion 31 and a terminal abutting member in the form of a second loop 30.

Mounted on the central shaft portion 31 near loop 30 is a slidable tubular spacer 32 which may abut the loop 30 and which includes flanged head 33, and a first rotatable spinner 34. Spinner 34 is of the buzz blade type and includes a substantially flat central body portion 35, with first triangularly shaped apertured lug member 36 through which central shaft portion 31 passes, and second triangularly shaped apertured lug member 37 through which central shaft portion 31 passes. A pair of opposed curved wings 38 and 39 extend outward from the central body portion 35, and act as propellers to rotate the first spinner 34 about central shaft portion 31 when artificial fishing lure 10 moves in the water.

A rotatable spinner 40, of the concave-convex blade or willow leaf type and including an aperture 41 passing therethrough, is secured to the end of movable arm 28 in a manner so as to allow pivotal as well as rotational movement of the spinner 40 relative to movable arm 28. Swivel connector 42 comprises a generally cylindrical hollow body with a first apertured side and a second apertured side. First swivel loop 43 includes a loop portion which interconnects with the loop 30 of arm 28, and a straight extension which passes through the first apertured side of swivel connector 42 and has a flanged end to prevent the first swivel loop from separating from the swivel connector 42. Second swivel loop 44 includes a loop portion which interconnects with ring 45 and a straight extension passing through the second apertured side of swivel connector 42 and having a flanged end to prevent the second swivel loop 44 from separating from the swivel connector 42. Ring 45 passes through both the second swivel loop 44 and through aperture 41. Spinner 40 is secured to arm 28 by means of first swivel loop 43, swivel connector 42, second swivel loop 44 and ring 45. The first and second swivel loops 43 and 44 are free to rotate relative to swivel connector 42.

Referring to FIG. 1, as the lure 10 is being pulled along the top surface or through the water, the arm 28 extends substantially above the frame member 12 and weight 19, in the position shown in solid line in FIG. 2. The interaction of loop 27 and loop 29 prevents arm 28 from extending further downward. The buzz blade or spinner 34 rotates around central shaft portion 31 of the arm 28 and creates sound waves in the water while also churning the water. The spinner 40 likewise revolves but also flits or jumps in a substantially random pattern in the wake of the water churned by spinner 34, thereby creating unique sound waves in the water very much like a bait fish. The spinner 34 and spinner 40 also serve to shield the hook 22 and fish-shaped weight 19 from floating debris such as weeds, algae or pond scum. The water disturbances caused by the spinner 34 and spinner 40 also tend to channel floating debris away from the hook 22 and weight 19 or dislodge any collected debris. The artificial fishing lure 10 is substantially weedless or anti-fouling and self-cleaning while being pulled through the water.

Figures 6, 7:
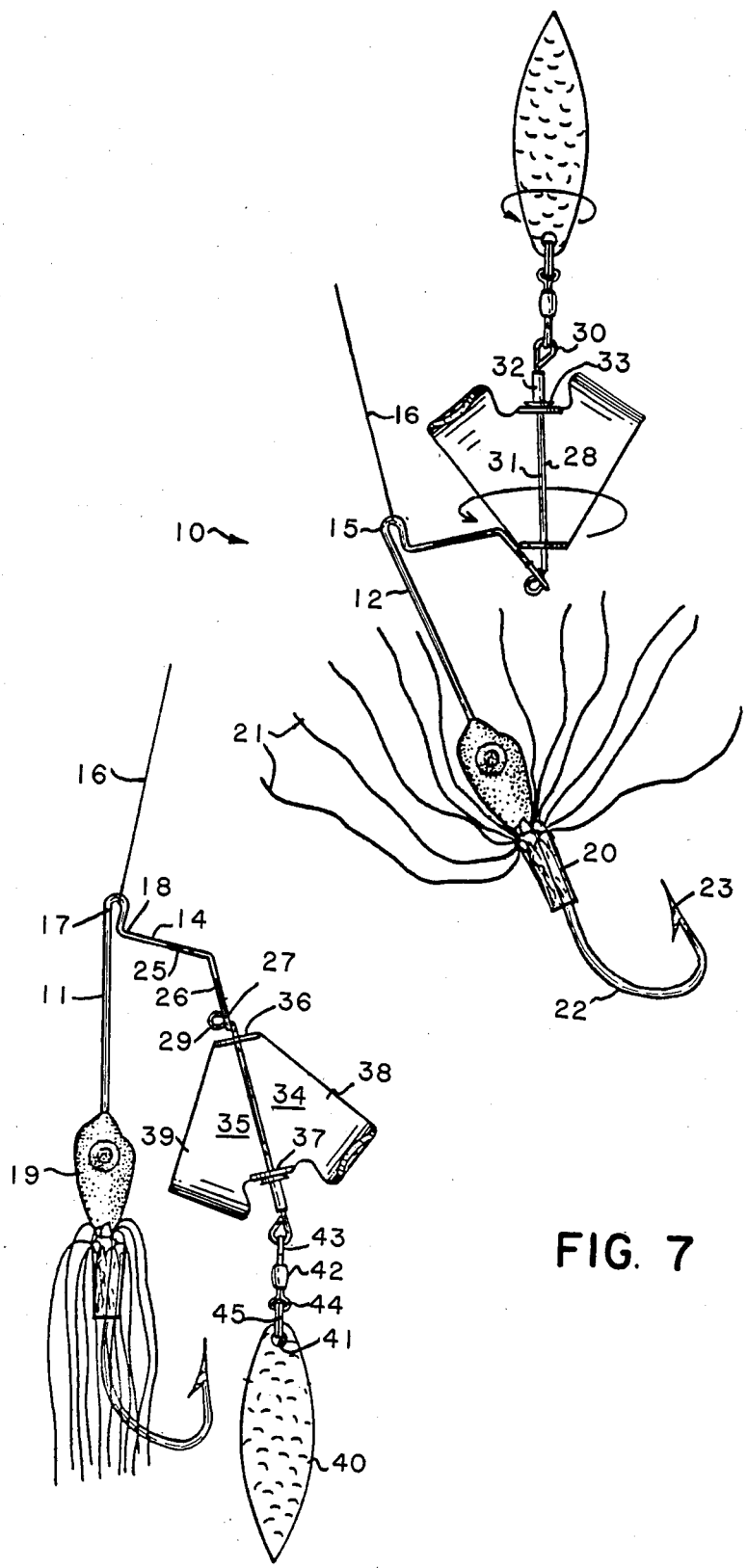
FIG. 6 is a side view of the artificial fishing lure of FIG. 1 wherein the lure is falling freely in the water.
FIG. 7 is a side view of the artificial fishing lure of FIG. 1 wherein the lure is resting stationary within the water.

Referring now to FIG. 6, as the lure 10 is falling freely downward through the water, the weight 19 drops below fishing line 24 and frame member 12 moves to a substantially upright or vertical position, while arm 28 pivots vertically in the opposite direction to approximately the position shown in solid line in FIG. 3. The arm 28 remains substantially vertical within the water as the lure 10 is free-falling, with the spinner 34 rotating and spinner 40 resting above the movable arm 28 and likewise rotating and moving like an injured bait fish. The sound waves produced by the rotating first spinner 34, frictional noise maker or spacer 32, and rotating and moving second spinner 40 very realistically immitate that of an injured bait fish, and are very attractive to predator fish in the area.

Usually a predator fish will strike and be caught during the descent of lure 10. However, if no strike occurs, the lure 10 may be maintained for a desired period of time in a relatively stationary position as illustrated in FIG. 7. While stationary, the frame member 12 remains substantially upright or vertical in the water, and movable arm 28 pivots to a downward resting position with the arm 28 being prevented from moving closer to frame member 12 or weight 19 by the interaction of loop 27 and the loop 29 of the arm 28. Spinner 40 rests substantially vertically in the water directly under the loop 30 of arm 28, and remains unobstructive to hook 22 and barbed point 23. If a predator fish should strike or contact the spinner 40, the spinner 34 or the arm 28, the arm 28 will be pushed outward or to the side and remain relatively unobstructive. A striking fish will merely push the spinner 40, spinner 34 or arm 28 aside during the strike and the hook 22 will not be obstructed.

Figure 5:
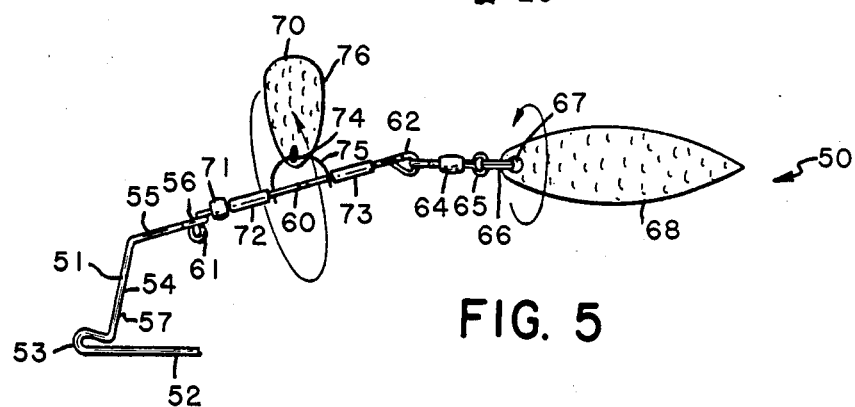
FIG. 5 is a partial side view of a further embodiment of the artificial fishing lure of FIG. 1, wherein a spinner blade assembly has been substituted for the buzz blade assembly of FIG. 1.

The alternative embodiment of an artificial fishing lure 50 shown in FIG. 5 is substantially the same as that shown in FIG. 1 with the exception of the first rotatable spinner 76. The lure 50 also includes a hook 22, barbed point 23, collar 20, strands 21 and fish-shaped weight 19 as shown in FIG. 1 which have been broken away in FIG. 5 for purposes of simplicity. A wire frame 51 includes a straight frame portion 52 with an end embedded in a fish-shaped weight (not shown), an open eyelet 53 to which a fishing line (not shown) may be tied, and an outwardly extending stationary frame portion 57 having a first portion 54 and an angularly disposed second portion 55 which terminates in loop portion 56.

Movable arm 60 extends through loop 56 on frame portion 57 and incudes a first loop 61 and a second loop 62. A second rotatable spinner 68, of the concave-convex blade type and including an aperture 67 passing therethrough, is secured to the end of movable arm 60 by means of first swivel loop 63, swivel connector 64, second swivel loop 65 and ring 66. The above parts of fishing lure 50 are identical in form and function to the corresponding parts for fishing lure 10.

Fishing lure 50 also includes an alternative first rotatable spinner 76, comprising a first spinning element 70 and U-shaped connector 75, mounted along the movable arm 60, along with alternative spacing or abutting elements mounted along movable arm 60. Abutting member 71 is secured along movable arm 60 near first looped end 61, and first movable tubular spacer 72 is adjacently placed. A second movable tubular spacer 73 is located near the second looped end 62, and the first rotatable spinning element 70 with aperture 74 passing therethrough is maintained between the first spacer 72 and the second spacer 73 by means of U-shaped connector 75. The U-shaped connector 75 has a central portion which passes through the aperture 74 in first spinning element 70, and first and second ends secured to the movable arm 60 by means of loops. The U-shaped connector 75 is capable of rotation about the movable arm 60 and guides the first spinning element 70 in rotation about movable arm 60. The alternative fishing lure 50 is capable of movements essentially identical to those of fishing lure 10 previously described.

While certain preferred embodiments of the invention have been specifically described herein, it is understood that modifications may be made therein that are within the spirit of the invention. For example, still other first or second spinners may alternatively be secured upon the movable arm or to the terminal end of the movable arm, or the bend in the movable arm could be modified to allow for a greater or lesser amount of downward movement of the arm relative to the main portion of the lure. If desired, one of the spinners may be eliminated entirely. The foregoing detailed description and the accompanying drawings are for purposes of illustration only, and are not intended as being limiting to the spirit or scope of the appended claims.

I claim:

1. In an artificial fishing lure of the class including first and second rearwardly diverging frame means having leading and trailing end portions, an eye means for attaching a fishing line connecting the adjacent leading end portions of said first and second frame means, and weight means and fish hook means carried by said first frame means, the improvement in combination therewith which comprises a movable arm member having leading and trailing end portions carried by said trailing end portion of the second frame means, fish attracting means carried by said arm member, connecting means for movably connecting said leading end portion of the arm member to said trailing end portion of the second frame means, said connecting means including a first terminal looped end and a first terminal end portion adjacent thereto on the said trailing end portion of the second frame means and a second terminal looped end and a second terminal end portion adjacent thereto on the said leading end portion of the arm member, the said first and second terminal looped ends lying in planes which are approximately perpendicular to each other, the external diameter of one of the said first and second terminal looped ends exceeding the internal diameter of the other of the said first and second terminal looped ends and its corresponding said terminal end portion extending through and being positioned within the said other of the first and second terminal looped ends while its corresponding terminal looped end is positioned generally between said other terminal looped end and said first frame means and is otherwise unconnected to said other terminal end to thereby movably connect the trailing end portion of the second frame means to the leading end portion of the said arm member to allow 360 degrees of rotation of the arm in the lateral plane of the arm, the said connecting means being effective to allow said arm member to move back and forth at the point of attachment at its leading end portion and to allow said trailing end portion thereof to move toward and away from said first frame means, and means including said connecting means for preventing said arm member and said fish attracting means carried thereby from moving toward said first frame means a distance sufficient to foul said first frame means, said weight means, said fish hook means, or a fishing line attached to said eye means, said first frame member and the weight means and fish hook means carried thereby, said second frame member and said eye means being constructed and arranged whereby they are maintained in substantially fixed relationship with respect to each other.

2. The fishing lure of claim 1 wherein said fish attracting means carried by the arm member includes a buzz blade.

3. The fishing lure of claim 1 wherein said fish attracting means carried by the arm member includes a spinner blade.

4. The fishing lure of claim 1 wherein the said fish attracting means carried by the arm member includes a frictional noise making means.

5. The fishing lure of claim 1 wherein a spinner blade means is attached to the said trailing end portion of the arm member and extends rearward therefrom, and the spinner blade is positioned above the said fish hook means when the fishing lure is pulled through the water thereby rendering it weedless.

6. The fishing lure of claim 5 wherein the said fish attracting means carried by the arm member includes a buzz blade, and the said spinner blade is in the wake of the buzz blade when the fishing lure is pulled through the water.

7. The fishing lure of claim 6 wherein the said fish attracting means carried by the arm member also includes a frictional noise making means.

8. The fishing lure of claim 1 wherein the said first terminal looped end lies in a plane that is approximately parallel to the longitudinal axis of the trailing end portion of the said second frame means, and the said second terminal looped end lies in a plane that is approximately parallel to the longitudinal axis of the said leading end portion of the arm member, the angle between said planes being about 90 degrees.

9. An artificial fishing lure comprising an elongated frame means having a leading end and a trailing end, the frame means including first and second generally longitudinally extending and rearwardly diverging elongated frame members having leading and trailing end portions, the said frame means also including an eye means connecting said leading end portions of the first and second frame members, the eye means being located adjacent said leading end of the frame means and being adapted to receive a fishing line whereby said fishing line may be attached to the fishing lure while fishing, the said trailing end portions of the elongated first and second frame members being arranged in spaced relationship with respect to each other, weight means carried by the said first frame member, fish hook means carried by the said trailing end portion of the first frame member and extending rearward therefrom, a pivotable elongated arm member having leading and trailing end portions carried by the said trailing end portion of the second frame member, fish attracting means carried by said arm member, connecting means for pivotably connecting said leading end portion of the arm member to the said trailing end portion of the second elongated frame member, said connecting means including a first terminal looped end and a first terminal end portion adjacent thereto on the said trailing end portion of the second frame means and a second terminal looped end and a second terminal end portion adjacent thereto on the said leading end portion of the arm member, the said first and second terminal looped ends lying in planes which are approximately perpendicular to each other, the external diameter of one of the said first and second terminal looped ends exceeding the internal diameter of the other of the said first and second terminal looped ends and its corresponding said terminal end portion extending through and being positioned within the said other of the first and second terminal looped ends while its corresponding terminal looped end is positioned generally between said other terminal looped end and said first frame means and is otherwise unconnected to said other terminal end to thereby pivotably connect the trailing end portion of the second frame means to the leading end portion of the said arm member to allow 360 degrees of rotation of the arm in the lateral plane of the arm, the said connecting means being effective to allow said arm member to pivot back and forth around the point of attachment at its leading end portion and to allow said trailing end portion thereof to move toward and away from said frame means, and means including said connecting means for preventing said arm member and said fish attracting means carried thereby from moving toward said frame means a distance sufficient to foul said frame means, said weight means, said fish hook means; or a fishing line attached to said eye means, said first frame member and the weight means and hook means carried thereby, said second frame member and said eye means being constructed and arranged whereby they lie in substantially the same plane and are maintained in substantially fixed relationship with respect to each other.

10. The fishing lure of claim 9 wherein said fish attracting means carried by the arm member includes a buzz blade.

11. The fishing lure of claim 9 wherein said fish attracting means carried by the arm member includes a spinner blade.

12. The fishing lure of claim 9 wherein said fish attracting means carried by the arm member includes a frictional noise making means.

13. The fishing lure of claim 9 wherein a spinner blade means is attached to the said trailing end portion of the arm member and extends rearward therefrom, and the spinner blade is positioned above the said fish hook means when the fishing lure is pulled through the water thereby rendering it weedless.

14. The fishing lure of claim 13 wherein the said fish attracting means carried by the arm member includes a buzz blade, and the said spinner blade is in the wake of the buzz blade when the fishing lure is pulled through the water.

15. The fishing lure of claim 14 wherein the said fish attracting means carried by the arm member also includes a frictional noise making means.

16. The fishing lure of claim 9 wherein the said first terminal looped end lies in a plane that is approximately parallel to the longitudinal axis of the trailing end portion of the said second frame member, and the said second terminal looped end lies in a plane that is approximately parallel to the longitudinal axis of the said leading end portion of the arm member, the angle between said planes being about 90 degrees.

* * * * *